United States Patent
Williams

(10) Patent No.: US 7,389,849 B2
(45) Date of Patent: Jun. 24, 2008

(54) STEERING APPARATUS WITH PLURAL MOTORS

(75) Inventor: Daniel E. Williams, Lebanon, IN (US)

(73) Assignee: TRW Automotive U.S. LLC, Livonia, MI (US)

( * ) Notice: Subject to any disclaimer, the term of this patent is extended or adjusted under 35 U.S.C. 154(b) by 116 days.

(21) Appl. No.: 11/085,431

(22) Filed: Mar. 21, 2005

(65) Prior Publication Data
US 2006/0225945 A1    Oct. 12, 2006

(51) Int. Cl.
B62D 5/06    (2006.01)

(52) U.S. Cl. .................. 180/432; 180/417; 180/421; 180/428

(58) Field of Classification Search ............. 180/417, 180/421, 442, 443, 444, 446, 414, 132, 403
See application file for complete search history.

(56) References Cited

U.S. PATENT DOCUMENTS

| | | | |
|---|---|---|---|
| 3,456,752 A | 7/1969 | Fonda | |
| 3,709,099 A | 1/1973 | Dumeah | |
| 3,991,846 A * | 11/1976 | Chichester et al. | 180/403 |
| 4,269,560 A * | 5/1981 | Thomas | 180/414 |
| 4,887,683 A | 12/1989 | Klosterhaus et al. | |
| 4,917,204 A * | 4/1990 | Andrew et al. | 180/414 |
| 5,267,627 A * | 12/1993 | Frank et al. | 180/422 |
| 5,445,239 A * | 8/1995 | Miller et al. | 180/422 |
| 5,582,207 A | 12/1996 | Gilbert et al. | |
| 5,653,304 A * | 8/1997 | Renfroe | 180/402 |
| 5,816,359 A * | 10/1998 | Gregorio et al. | 180/403 |
| 5,851,015 A | 12/1998 | Klosterhaus | |
| 5,899,292 A * | 5/1999 | Paul et al. | 180/419 |
| 5,975,573 A | 11/1999 | Belleau | |
| 6,070,691 A * | 6/2000 | Evans | 180/443 |
| 6,244,371 B1 * | 6/2001 | Bohner et al. | 180/403 |
| 6,283,483 B1 | 9/2001 | Johnson et al. | |
| 6,336,519 B1 * | 1/2002 | Bohner et al. | 180/403 |
| 6,502,661 B1 * | 1/2003 | Heitzer | 180/403 |
| 6,546,322 B2 | 4/2003 | Williams | |
| 6,612,393 B2 * | 9/2003 | Bohner et al. | 180/405 |
| 6,655,709 B2 | 12/2003 | Sherwin et al. | |

* cited by examiner

Primary Examiner—Lesley D. Morris
Assistant Examiner—Marc A Scharich
(74) Attorney, Agent, or Firm—Tarolli, Sundheim, Covell & Tummino LLP

(57) ABSTRACT

An apparatus (10) for use in turning steerable vehicle wheels (12, 14) includes first and second piston and cylinder type hydraulic motors (32, 34) which are connected with a central portion of a vehicle. A steering control valve (24) is operable in response to manual rotation of a steering wheel (18) to effect extension and contraction of the first and second hydraulic motors. A rack and pinion steering gear (110, 114) may be connected with a piston rod (86) of one of the hydraulic motors (32). A secondary control valve (200) may be provided to effect operation of one of the hydraulic motors to a greater extent than the other hydraulic motor.

16 Claims, 2 Drawing Sheets

STEERING APPARATUS WITH PLURAL MOTORS

BACKGROUND OF THE INVENTION

The present invention is directed to a new and improved apparatus for use in turning steerable vehicle wheels in response to rotation of a steering wheel. The apparatus includes first and second hydraulic motors which are connected with the steerable vehicle wheels.

Steerable vehicle wheels have previously been turned by a rack and pinion steering system. The rack and pinion steering system may include a hydraulic motor which is connected with the steerable vehicle wheels in the manner disclosed in U.S. Pat. No. 3,709,099. Other known rack and pinion steering systems are disclosed in U.S. Pat. Nos. 4,887,683 and 5,851,015.

Steerable vehicle wheels have also been turned by steer-by-wire steering systems. In a known steer-by-wire steering system, there has been no mechanical connection between a steering wheel and a steering apparatus connected with steerable vehicle wheels. In at least one known steer-by-wire steering system, a transmitter assembly associated with a steering wheel sends a signal to a receiver assembly associated with a steering apparatus connected with the steerable vehicle wheels. This steering apparatus is actuated in accordance with the signal received by the receiver assembly. Known steer-by-wire steering systems are disclosed in U.S. Pat. Nos. 6,546,322 and 6,655,709.

SUMMARY OF THE INVENTION

The present invention relates to a new and improved apparatus for use in turning steerable vehicle wheels in response to manual rotation of a steering wheel. The apparatus includes first and second piston and cylinder type hydraulic motors which are connected with the steerable vehicle wheels and with a central portion of the vehicle. Upon manual rotation of a steering wheel, a steering control valve is operable to direct fluid flow to effect extension of one of the hydraulic motors and retraction of the other hydraulic motor.

The hydraulic motors may have central axes which intersect at the central portion of the vehicle. If desired, a second valve may be connected in fluid communication with the hydraulic motors to effect operation of one of the hydraulic motors to a greater extent than the other hydraulic motor during turning of the steerable vehicle wheels.

Although it is contemplated that many different types of steering mechanisms may be utilized, in one embodiment of the invention a rack and pinion steering mechanism is connected with the steering control valve. The rack and pinion steering mechanism may include an array of rack gear teeth which are disposed on a piston rod of one of the motors and may be enclosed by a cylinder of the one motor.

A steering apparatus constructed in accordance with the present invention may be used in a steer-by-wire steering system. However, the steering apparatus may be used in other systems. For example, a steering apparatus constructed in accordance with the present invention may be used in a steering system in which there is a mechanical connection between the steering wheel and the steering apparatus.

BRIEF DESCRIPTION OF THE DRAWINGS

The foregoing and other features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
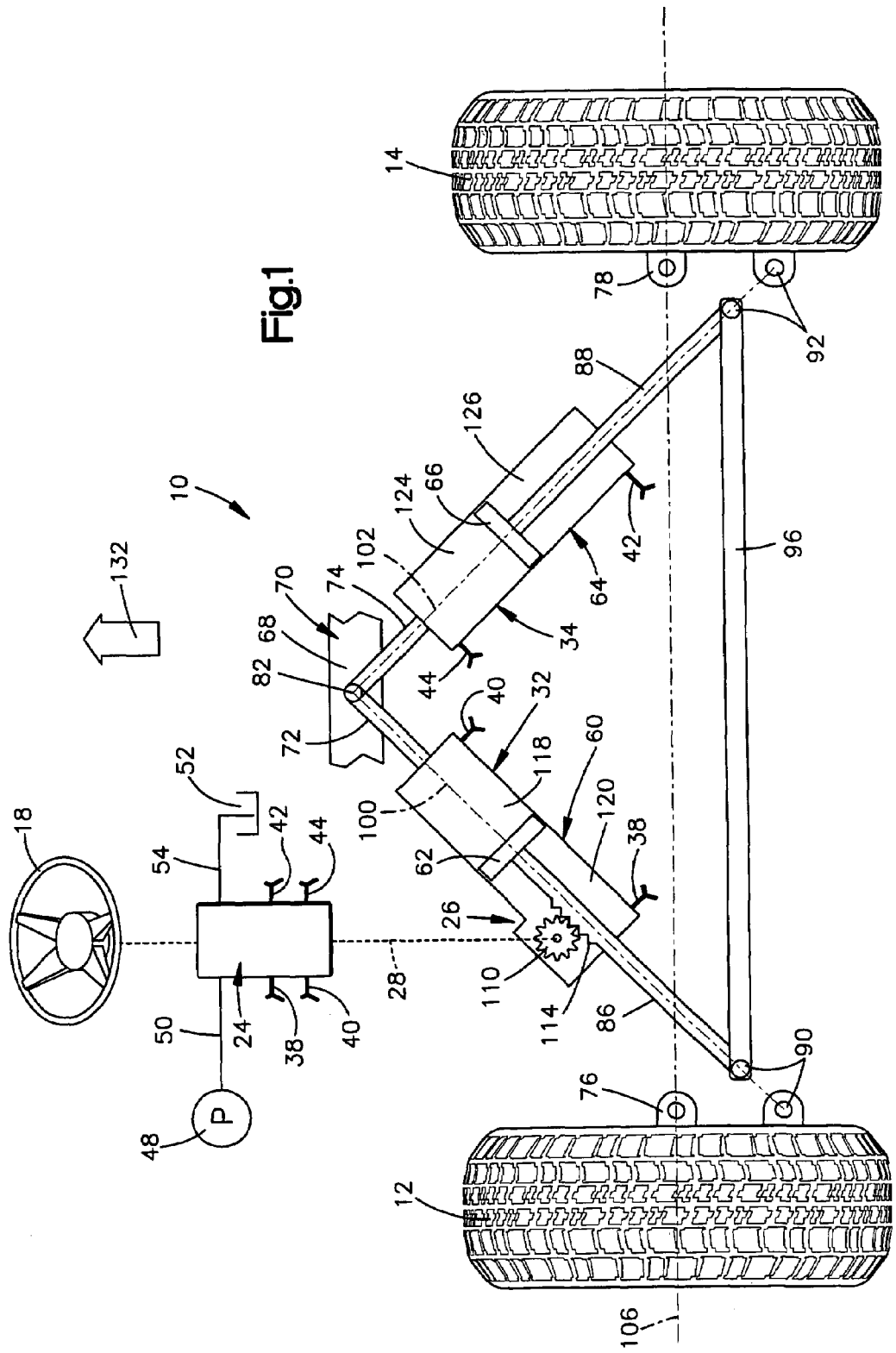
FIG. 1 is a schematic illustration of a steering apparatus constructed in accordance with the present invention and illustrating the relationship of piston and cylinder type hydraulic motors to steerable vehicle wheels.

A steering apparatus 10 (FIG. 1) is operable to turn steerable front wheels 12 and 14 of a vehicle in a steering system using Ackerman steering principles. The illustrated steering apparatus 10 is a steer-by-wire steering system. Therefore, the steering apparatus 10 is free of a mechanical connection between a steering wheel 18 and the steerable vehicle wheels 12 and 14 during normal operation. However, if desired, the steering apparatus 10 may have a mechanical connection between the steering wheel and the steerable vehicle wheels 12 and 14.

The steering apparatus 10 includes a valve 24 which is connected with and actuated by the steering wheel 18 and a rack and pinion power steering mechanism 26. The valve 24 is connected with the rack and pinion power steering mechanism 26 by a mechanical connection which is indicated schematically at 28 in FIG. 1. The valve 24 and rack and pinion power steering mechanism 26 may be interconnected and cooperate in a manner disclosed in U.S. Pat. No. 3,709,099. Alternatively, the valve 24 and rack and pinion steering mechanism 26 may be interconnected and cooperate in the manner disclosed in U.S. Pat. No. 5,582,207.

In addition to being connected with the rack and pinion power steering mechanism 26, the valve 24 is connected in fluid communication with hydraulic power steering motors 32 and 34. Thus, the valve 24 is connected in fluid communication with the power steering motor 32 by conduits 38 and 40. Similarly, the valve 24 is connected in fluid communication with the power steering motor 34 by conduits 42 and 44. In addition to being connected with the power steering motors 32 and 34, the valve 24 is connected with a power steering fluid pump 48 through a fluid supply conduit 50 and is connected with a reservoir 52 through a drain conduit 54.

Upon rotation of the steering wheel 18, a signal is sent from a transmitter (not shown) connected with a steering wheel 18 to a receiver (not shown) connected with the valve 24. The transmitter and receiver connected with the steering wheel and valve 24 have the same construction and mode of operation as is described in U.S. Pat. No. 6,655,709. Alternatively, the steering wheel 18 and valve 24 may be interconnected in the manner disclosed in U.S. Pat. No. 6,546,322. Of course, a mechanical connection may be provided between the steering wheel 18 and the valve 24 if desired.

The power steering motors 32 and 34 are of the piston and cylinder type. The power steering motor 32 includes a cylinder 60 which encloses a piston 62. Similarly, the power steering motor 34 includes a cylinder 64 which encloses a piston 66.

In the embodiment of the invention illustrated in FIG. 1, the cylinders 60 and 64 are connected to a central portion 68 of an axle 70 by connector members 72 and 74. The steerable vehicle wheels 12 and 14 are pivotally connected to opposite end portions of the axle 70 at pivot connections or king pins 76 and 78 in a known manner. Rather than being connected to the axle 70, in the manner illustrated schematically in FIG. 1, the cylinders 60 and 64 may be connected with a frame or base member at a central portion of the vehicle by the connector members 72 and 74.

The connector members 72 and 74 are connected with the central portion 68 of the axle 70 at a single pivot connection 82. However, if desired, a plurality of pivot connections may be provided between the connector members 72 and 74 and the central portion of the axle 70. The pivot connection 82 is disposed midway between the steerable vehicle wheels 12 and 14.

Piston rods 86 and 88 are fixedly secured to the pistons 62 and 66 and extend from the cylinders 60 and 64. Outer end portions of the piston rods 86 and 88 are connected with the steerable vehicle wheels 12 and 14 at pivot connections 90 and 92. A force transmitting member 96 extends between the pivot connections 90 and 92 and functions as a tie rod to interconnect the steerable vehicle wheels 12 and 14.

The power steering motors 32 and 34 are connected in a triangular relationship with the force transmitting member 96. The power steering motors 32 and 34 are connected with the central portion 68 of the axle 70 at the pivot connection 82. The pivot connection 82 is disposed at a location midway between the steerable vehicle wheels 12 and 14. As was previously mentioned, a separate pivot connection may be provided for each power steering motor 32 and 34 at spaced apart locations on the central portion of the axle 70 or a frame member.

The power steering motors 32 and 34 have longitudinal central axes 100 and 102 which intersect at the pivot connection 82. The central axis 100 of the power steering motor 32 extends through the pivot connection 90 between the force transmitting member 96 and the steerable vehicle wheel 12. Similarly, the central axis 102 of the power steering motor 34 extends through the pivot connection 92 between the force transmitting member 96 and the steerable vehicle wheel 14.

When the vehicle wheels 12 and 14 are in the straight ahead orientation of FIG. 1, the central axis of the force transmitting member 96 extends parallel to an axis 106 which extends through the pivot connections 76 and 78 between the steerable vehicle wheels 12 and 14 and opposite end portions of the axle 70. The axis 106 may be coincident with a longitudinal central axis of the axle 70.

The central axes 100 and 102 of the power steering motors 32 and 34 are skewed at an acute angle relative to the force transmitting member 96 and to the central axis 106 of the axle 70. Of course, as the steerable vehicle wheels 12 and 14 are turned from the straight ahead orientation of FIG. 1, the angles between the central axes of the motors 32 and 34 and the central axis 106 of the axle 70 will vary.

The rack and pinion power steering mechanism 26 includes a rotatable pinion gear 110 which is connected with the valve 24. The pinion gear 110 is disposed in meshing engagement with a linear array of rack teeth 114. The rack teeth 114 are formed on the piston rod 86 of the power steering motor 32 at a location which is spaced from the piston 62. The pinion 110 is rotatable about an axis which extends perpendicular to the central axis 100 of the motor 32. Upon relative movement between the piston 62 and the motor cylinder 60, the rack teeth 114 on the piston rod 86 are effective to rotate the pinion 110.

The piston 62 is effective to divide the cylinder 60 of the power steering motor 32 into a cylindrical variable volume head end chamber 118 and a cylindrical variable volume rod end chamber 120. Similarly, the piston 66 is effective to divide the cylinder 64 of the power steering motor 34 into a cylindrical variable volume head end chamber 124 and a cylindrical variable volume rod end chamber 126. The pistons 62 and 66 have the same diameter. The piston rods 86 and 88 have the same cross sectional area.

The pinion 110 and rack teeth 114 are disposed in the variable volume rod end chamber 120 of the power steering motor 32. The pinion 110 is spaced from the piston 62. Similarly, the rack teeth 114 are spaced from the piston 62. However, the pinion 110 and rack teeth 114 are exposed to the fluid pressure in the rod end chamber 120 of the power steering motor 32.

The pinion 110 is connected with the valve 24 by a mechanical connection 28 having the same construction as is disclosed in U.S. Pat. No. 3,709,099.

Alternatively, the pinion 110 may be connected with the valve 24 by a mechanical connection 28 having the same construction as is disclosed in U.S. Pat. No. 5,582,207. Regardless of how the mechanical connection 28 interconnects the valve 24 and the pinion 110, operation of the power steering motor 32 with a resulting movement of the piston 62 results in rotation of the pinion.

When the valve 24 is actuated by turning of the steering wheel 18, one of the head and rod end chambers 118 and 120 in the power steering motor 32 is connected with relatively high fluid pressure from the power steering fluid pump 48 and the other chamber is connected with the relatively low fluid pressure of the reservoir 52. Similarly, upon actuation of the valve 24, either the head end chamber 124 or the rod end chamber 126 of the power steering motor 34 is connected with relatively high fluid pressure from the power steering pump 48 and the other chamber is connected with the relatively low fluid pressure of the reservoir 52.

When the vehicle is moving forward, that is, in the direction of an arrow 132 in FIG. 1, and is to be turned toward the left (as viewed in FIG. 1), the steering wheel 18 is rotated in a counterclockwise direction (as viewed in FIG. 1). This results in actuation of the valve 24 to increase the fluid pressure in the rod end chamber 120 and decrease the fluid pressure in the head end chamber 118 of the power steering motor 32. At the same time, the fluid pressure in the head end chamber 124 of the power steering motor 34 is increased and the fluid pressure in the rod end chamber 126 is decreased.

The piston 62 in the power steering motor 32 moves toward the pivot connection 82 to increase the size of the rod end chamber 120 and decrease the size of the head end chamber 118. Similarly, the piston 66 in the power steering motor 34 moves away from the pivot connection 82 to decrease the size of the rod end chamber 126 and increase the size of the head end chamber 124. As this occurs, the power steering motor 32 is contracted and the power steering motor 34 is extended. This results in the steerable vehicle wheels 12 and 14 being turned in a counterclockwise direction about the pivot connections 76 and 78. As the steerable vehicle wheels 12 and 14 are turned, the vehicle moves forward and turns toward the left.

When the vehicle is to be turned toward the right, the steering wheel 18 is rotated in a clockwise direction, as viewed in FIG. 1. This results in the fluid pressure in the rod end chamber 120 of the power steering motor 32 decreasing and the fluid pressure in the head end chamber 118 of the power steering motor 32 increasing. Similarly, the fluid pressure in the rod end chamber 126 of the power steering motor 34 increases while the fluid pressure in the head end chamber 124 decreases. This results in extension of the power steering motor 32 and contraction of the power steering motor 34. As this occurs, the steerable vehicle wheels 12 and 14 are turned toward the right (as viewed in FIG. 1).

During turning of the steerable vehicle wheels 12 and 14 toward either the left or right, the piston rod 86 moves relative to the cylinder 60 of the power steering motor 32. This results in movement of the rack teeth 114 along the central axis 100 of the power steering motor 32 and rotation of the pinion 110. This rotational movement of the pinion 110 is transmitted to the valve 24 by the mechanical connection 28. This results in the valve 24 being actuated to an extent corresponding to the extent of rotation of the pinion 110 and operation of the power steering motors 32 and 34 during turning movement of the steerable vehicle wheels 12 and 14.

Figure 2:
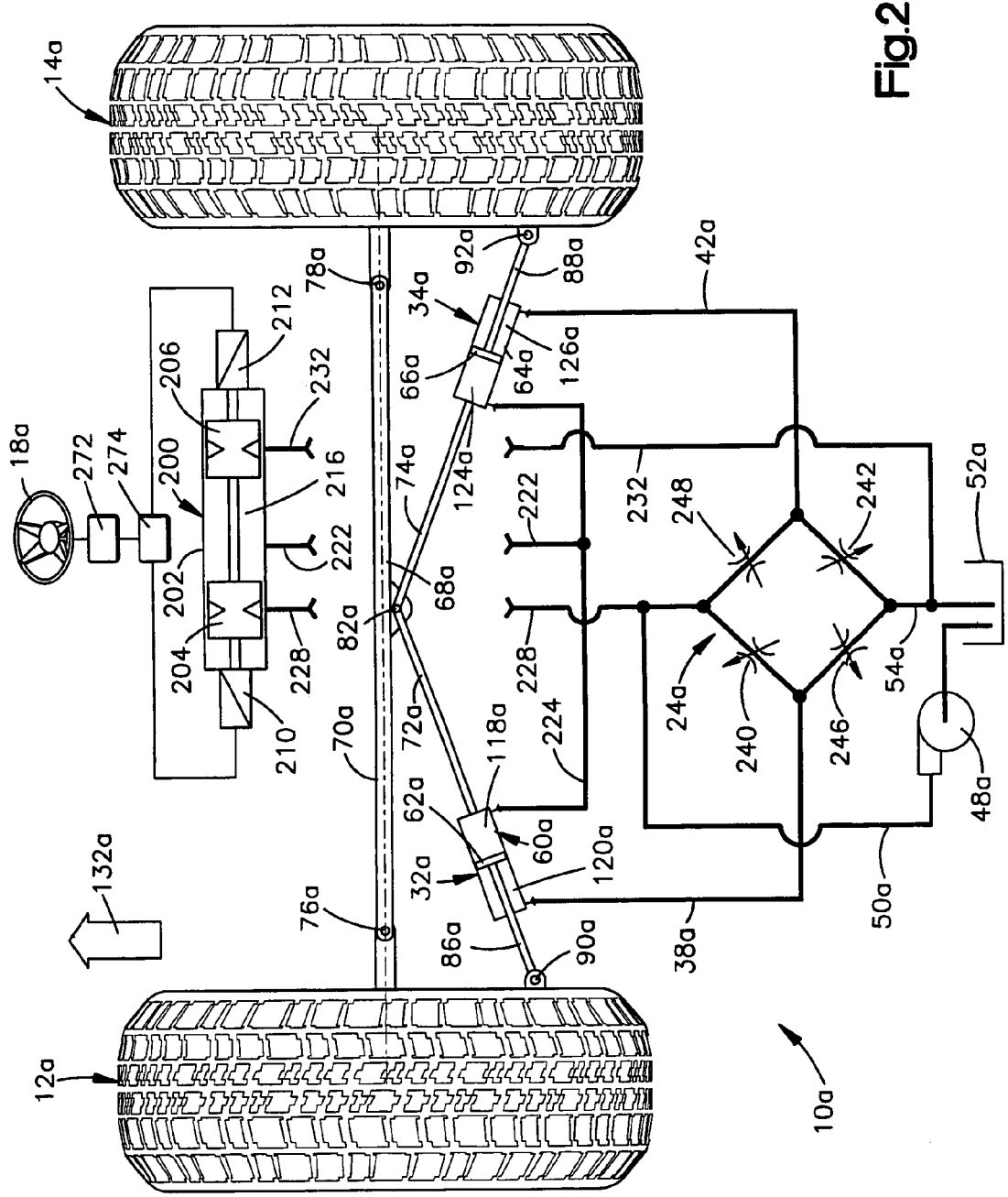
FIG. 2 is a schematic illustration, generally similar to FIG. 1, illustrating a relationship of piston and cylinder type hydraulic motors to steerable vehicle wheels and to a secondary control valve.

Embodiment of FIG. 2

In the embodiment of the invention illustrated in FIG. 1, when the steering wheel 18 is rotated, the power steering motors 32 and 34 are operated to the same extent. Thus, the distance through which the piston 62 moves relative to the cylinder 60 is the same as the distance to which the piston 66 moves relative to the cylinder 64. Of course, the power steering motor 32 is operated in the opposite direction from the power steering motor 34.

In the embodiment of the invention illustrated in FIG. 2, power steering motors connected with the steerable vehicle wheels are operated to different extents during turning movement of the steerable vehicle wheels to enable perfect or at least improved steering to be accomplished in accordance with Ackerman Steering Principles. In accordance with Ackerman Steering Principles, it is desirable to have steerable vehicle wheels turn through concentric arcs. This results in the steerable vehicle wheel on an inside of a turn moving along an arc having a smaller radius of curvature than a wheel on the outside of the turn. To enable the wheel on the inside of the turn to follow an arc having a smaller radius than the wheel on the outside of the turn, the wheel on the inside of the turn must be turned through a larger arcuate distance from a straight ahead position than a wheel on the outside of the turn. In the embodiment of the invention illustrated in FIG. 2, this is accomplished by operating one of the power steering motors to a greater extent than the other power steering motor.

Since the embodiment of the invention illustrated in FIG. 2 is generally similar to the embodiment of the invention illustrated in FIG. 1, similar numerals will be utilized to identify similar components, the suffix letter "a" being associated with the numerals of FIG. 2 to avoid confusion.

A steering apparatus 10a is operable to turn steerable vehicle wheels 12a and 14a upon rotation of a steering wheel 18a. The steering wheel 18a is connected with a steering control valve 24a. The steering control valve 24a is connected with a power steering mechanism, corresponding to the rack and pinion power steering mechanism 26 of FIG. 1. Although it is believed that it may be desired to provide a power steering mechanism having the same construction and mode of operation as the power steering mechanism 26 of FIG. 1, it is contemplated that a power steering mechanism having a different construction may be associated with the steering control valve 24a.

The steering control valve 24a (FIG. 2) is connected with power steering motors 32a and 34a. The power steering motor 32a includes a cylinder 60a which is connected with a central portion 68a of an axle 70a by a connector member 72a. A piston 62a is disposed within a cylinder 60a and is connected with the steerable vehicle wheel 12a by a piston rod 86a. The piston rod 86a is pivotally connected to the steerable vehicle wheel 12a at a pivot connection 90a. A conduit 38a connects a rod end chamber 120a of the power steering motor 32a in fluid communication with the steering control valve 24a.

Similarly, the power steering motor 34a includes a cylinder 64a which is connected with the central portion 68a of the axle 70a by a connector member 74a. A piston 66a is disposed within a cylinder 64a and is connected with the steerable vehicle wheel 14a by a piston rod 88a. The piston rod 88a is pivotally connected to the steerable vehicle wheel 14a at a pivot connection 92a. A rod end chamber 126a is connected with the steering control valve 24a by a conduit 42a.

The steerable vehicle wheels 12a and 14a are connected with opposite end portions of the axle 70a at pivot connections or king pins 76a and 78a. The connector members 72a and 74a are connected to the central portion 68a of the axle 70a at a pivot connection 82a. The pivot connection 82a is disposed midway between the steerable vehicle wheels 12a and 14a. Although only a single pivot connection 82a is shown, a separate pivot connection may be provided for each of the power steering motors 32a and 34a. If desired, the pivot connection 82a may be provided on a component of the vehicle other than the axle 70a. The central axes of the power steering motors 32a and 34a intersect each other at the pivot connection 82a and extend at an acute angle to a longitudinal central axis of the axle 70a.

The steering control valve 24a is connected in fluid communication with a power steering pump 48a by a conduit 50a. The power steering control valve 24a is connected with a reservoir 52a by conduit 54a. The steering control valve 24a is connected in fluid communication with the power steering motors 32a and 34a by conduits 38a and 42a.

A secondary control valve 200 includes a valve housing 202 in which interconnected valve spools 204 and 206 are disposed. Upon energization of a solenoid 210, the valve spools 204 and 206 are both shifted to the left (as viewed in FIG. 2). Similarly, upon energization of solenoid 212, the valve spools 204 and 206 both are shifted to the right. A valve chamber 216 is disposed between the valve spools 204 and 206. The valve chamber 216 is connected in fluid communication with head end chambers 118a and 124a of the power steering motors 32a and 34a by conduits 222 and 224.

The secondary control valve 200 is connected with the power steering pump 48a and the steering control valve 24a by a conduit 228. Similarly, the secondary control valve 200 is connected with the steering control valve 24a and reservoir 52a by a conduit 232.

When the vehicle is moving straight ahead, in the manner indicated by the arrow 132a in FIG. 2, the steering control valve 24a and secondary control valve 200 are in their initial conditions and the steerable vehicle wheels are in a straight ahead orientation, as shown in FIG. 2. When the vehicle is to be turned toward the right (as viewed in FIG. 2), the steering control valve 24a is actuated to decrease the size of variable size orifices 240 and 242. At the same time, variable size orifices 246 and 248 are increased in size. This results in an increase in the fluid pressure in the rod end chamber 126a of the power steering motor 34a and a decrease in the fluid pressure in the rod end chamber 120a of the power steering motor 32a.

The increase in fluid pressure in the rod end chamber 126a of the power steering motor 34a moves the piston 66a toward the pivot connection 82a to pivot the wheel 14a in a clockwise direction about the pivot connection 78a. As the size of the rod end chamber 126a of the power steering motor 34a is being increased, the size of the head end chamber 124a is being decreased. This results in fluid being conducted from the head end chamber 124a of the power steering motor 34a to the head end chamber 118a of the power steering motor 32a through the conduit 224. As this occurs, the piston 62a is moved away from the pivot connection 82a to pivot the steerable vehicle wheel 12a in a clockwise direction about the pivot connection 76a. The head end chamber 120a of the power steering motor 32a decreases in size and fluid is exhausted from the power steering motor 32a through the conduit 38a to the reservoir 52a through the variable size orifice 246 in the steering control valve 24a.

Since the vehicle is turning toward the right (as viewed in FIG. 2), the steerable vehicle wheel 14a is on the inside of the turn. Therefore, in order to achieve steering in accordance with Ackerman principles, the steerable vehicle wheel 14a must be turned through a larger arcuate distance about the pivot connection 78a then the arcuate distance which the steerable vehicle wheel 12a turns about the pivot connection 76a. This is accomplished by energizing the solenoid 212 to move the valve spools 204 and 206 toward the right (as viewed in FIG. 2) to connect the conduits 222 and 224 in fluid communication with the reservoir 52a through the conduit 232. This results in the power steering motor 34a being contracted to a greater extent than which the power steering motor 32a is extended. Therefore, the arc about which the steerable vehicle wheel 14a on the inside of the turn pivots is larger than the arc about which the steerable vehicle wheel 12a on the outside of the turn pivots to obtain improved Ackerman steering.

When the steerable vehicle wheels 12a and 14a are to be turned to the left (as viewed in FIG. 2), the steering control valve 24a is actuated to increase the size of the variable size orifices 240 and 242 and to decrease the size of the variable size orifices 246 and 248. This results in the fluid pressure in the rod end chamber 120a of the power steering motor 32a increasing and the fluid pressure in the rod end chamber 126a of the power steering motor 34a decreasing. As this occurs, fluid flows from the head end chamber 118a of the power steering motor 32a through the conduit 224 to the head end chamber 124a of the power steering motor 34a.

In order to effect turning of the steerable vehicle wheel 12a on the inside of the turn to a greater extent than the steerable vehicle wheel 14a, the solenoid 212 is energized. This connects the conduit 224 with the reservoir 52a through the conduit 222, secondary control valve 200 and the conduit 232.

The steerable vehicle wheels 12a and 14a are urged back toward the straight ahead condition of FIG. 2 by cooperation between the steerable vehicle wheels 12a and 14a and the steering apparatus 10a. The geometry of the front kingpins 76a and 78a is such that as the steerable vehicle wheels 12a and 14a are turned, the front axle 70a rises through a small distance. Elevation of the front axle during turning provides potential energy to turn the steerable vehicle wheels 12a and 14a back toward the straight ahead condition. In addition, when the vehicle is moving, side forces generated at the contact patches of the steerable vehicle wheels 12a and 14a produce moments on the steerable vehicle wheels urging them back toward the straight ahead condition.

When the steerable vehicle wheels 12a and 14a are in either the straight ahead condition of FIG. 2 or a turned condition, control fluid pressure is conducted from the power steering pump 48a to the steering control valve 24a. This results in fluid pressure being conducted through the conduits 38a and 42a to the rod end chamber 120a in the power steering; motor 32a and to the rod end chamber 126a in the power steering motor 34a. The control fluid pressure in the rod end chambers 120a and 126a is resisted by fluid pressure in the head end chambers 118a and 124a of the power steering motors 32a and 34a.

When the steerable vehicle wheels 12a and 14a have been turned, restoring forces acting on the steerable vehicle wheel on the outside of the turn are added to the control fluid pressure in the associated one of the rod end chambers 120a or 126a in a power steering motor 32a or 34a. The additional fluid pressure in the rod end chamber 120a or 126a associated with the steerable vehicle wheel 12a or 14a on the outside of the turn results in an increase in the fluid pressure in an associated head end chamber 118a or 124a. The increased fluid pressure in the head end chamber 118a or 124a is transmitted to the conduit 224. The fluid pressure in the conduit 224 may be considered as acting as a tie rod which is varied in length with variations in fluid pressure.

When the steerable vehicle wheels 12a and 14a are to be returned from either a left turn or a right turn to the straight ahead condition of FIG. 2, the solenoid 210 is energized to move the valve spool 204 toward the left as viewed in FIG. 2. This results in the conduit 224 which interconnects the head end chambers 118a and 124a of the power steering motors 32a and 34a being connected with the power steering fluid supply pump 48a through the conduit 228, the steering control valve 200 and the conduit 222. As this occurs, the motors 32a and 34a are operated back to their initial conditions illustrated in FIG. 2. When the motors 32a and 34a have returned to their initial conditions and the vehicle wheels 12a and 14a are straight ahead, the secondary control valve 200 is in the closed or initial condition illustrated in FIG. 2.

The solenoids 210 and 212 are energized as a function of the direction and extent of rotation of the steering wheel 18a. The steering wheel 18a is connected with an encoder 272. The encoder 272 has an output signal which is transmitted to a controller 274.

When the output from the encoder 272 indicates that the steering wheel 270 is being rotated through a predetermined distance in either a clockwise or counterclockwise direction from an initial condition, the controller 274 energizes the solenoid 212 to enable fluid to flow from the conduit 224 connecting the head end chambers 118a and 124a of the power steering motors 32a and 34a. When the output from the encoder 272 indicates that the steering wheel 18a is being rotated back to the initial condition, the controller energizes the solenoid 210 to enable fluid to flow from the conduit 228, through the secondary control valve 200 to the conduits 222 and 224.

Although the valve 24 of FIG. 1 has not been illustrated as having variable size orifices, the valve 24 has variable size orifices corresponding to the variable size orifices 240, 242, 246 and 248 of the valve 24a. If desired, the secondary control valve 200 may be utilized in association with the embodiment of the invention illustrated in FIG. 1.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning first and second steerable vehicle wheels of a vehicle in response to manual rotation of a steering wheel, said apparatus comprising:

a first cylinder type hydraulic motor connected with the first steerable vehicle wheel and with a central portion of the vehicle, a second cylinder type hydraulic motor connected with the second steerable vehicle wheel and with the central portion of the vehicle, a steering control valve which is connected in fluid communication with said first and second hydraulic motors, said steering control valve being operable in response to manual rotation of the steering wheel in one direction to enable fluid to flow to the first hydraulic motor to effect contraction of the first hydraulic motor and to enable fluid to flow from the second hydraulic motor to effect expansion of the second hydraulic motor, said steering control valve being operable in response to manual rotation of the steering wheel in a direction opposite to the one direction to enable fluid to flow from the first hydraulic motor to effect expansion of the first hydraulic motor and to enable fluid to flow to the second hydraulic motor to effect contraction of the second hydraulic motor, a pinion connected with said steering control valve, and an array of rack teeth connected with said first hydraulic motor, said pinion being disposed in meshing engagement with said array of rack teeth and being rotatable by said array of rack teeth upon operation of said first hydraulic motor.

2. The apparatus as set forth in claim 1 wherein said apparatus is a steer-by-wire steering system which is normally free of mechanical connection between the steering wheel and the first and second steerable vehicle wheels.

3. The apparatus as set forth in claim 1 wherein said first and second hydraulic motors have central axes which intersect at the central portion of the vehicle.

4. The apparatus as set forth in claim 3 wherein the central axes of said first and second hydraulic motors are skewed at an acute angle to an axis extending through central portions of the first and second steerable vehicle wheels.

5. The apparatus as set forth in claim 1 wherein said first hydraulic motor includes a cylinder, a piston disposed in said cylinder, and a piston rod connected to said piston and extending from said cylinder, said array of rack teeth being disposed on said piston rod and being enclosed by said cylinder, said pinion being at least partially enclosed by said cylinder and spaced from said piston during at least a portion of the operation of said first hydraulic motor.

6. The apparatus as set forth in claim 1 further including a second control valve which is connected in fluid communication with said first and second hydraulic motors and is operable to effect operation of one of said first and second hydraulic motors to a greater extent than the other of said first and second hydraulic motors during turning of the steerable vehicle wheels.

7. The apparatus as set forth claim 1 further including a secondary control valve which is connected in fluid communication with said first and second hydraulic motors, said secondary control valve being operable in response to rotation of the steering wheel in a first direction to effect operation of said first hydraulic motor to a greater extent than said second hydraulic motor during rotation of the steering wheel in the first direction, said secondary control valve being operable in response to rotation of the steering wheel in a second direction to effect operation of said second hydraulic motor to a greater extent than said first hydraulic motor during rotation of the steering wheel in the second direction.

8. The apparatus as set forth in claim 1 further including an axle, said first steerable vehicle wheel being pivotally connected to a first end portion of said axle, said second steerable vehicle wheel being pivotally connected to a second end portion of said axle, said central portion of the vehicle being disposed on said axle at a location midway between said first and second end portions of said axle.

9. An apparatus for use in turning first and second steerable vehicle wheels of a vehicle in response to manual rotation of a steering wheel, said apparatus comprising:

a first cylinder type hydraulic motor connected with the first steerable vehicle wheel and with a central portion of the vehicle, a second cylinder type hydraulic motor connected with the second steerable vehicle wheel and with the central portion of the vehicle, and a steering control valve which is connected in fluid communication with said first and second hydraulic motors, said steering control valve being operable in response to manual rotation of the steering wheel in one direction to enable fluid to flow to the first hydraulic motor to effect contraction of the first hydraulic motor and to enable fluid to flow from the second hydraulic motor to effect expansion of the second hydraulic motor, said steering control valve being operable in response to manual rotation of the steering wheel in a direction opposite to the one direction to enable fluid to flow from the first hydraulic motor to effect expansion of the first hydraulic motor and to enable fluid to flow to the second hydraulic motor to effect contraction of the second hydraulic motor, said first and second hydraulic motors having axes which intersect at the central portion of the vehicle, both of said first and second hydraulic motors being connected to the central portion at a single pivot connection.

10. An apparatus for use in turning first and second steerable vehicle wheels of a vehicle in response to manual rotation of a steering wheel, said apparatus comprising:

a first cylinder type hydraulic motor connected with the first steerable vehicle wheel and with a central portion of the vehicle, a pinion in meshing engagement with a part of said first hydraulic motor, a second cylinder type hydraulic motor connected with the second steerable vehicle wheel and with the central portion of the vehicle, and a steering control valve which is connected in fluid communication with said first and second hydraulic motors, said steering control valve being operable in response to manual rotation of the steering wheel in one direction to enable fluid to flow to the first hydraulic motor to effect contraction of the first hydraulic motor and to enable fluid to flow from the second hydraulic motor to effect expansion of the second hydraulic motor, said steering control valve being operable in response to manual rotation of the steering wheel in a direction opposite to the one direction to enable fluid to flow from the first hydraulic motor to effect expansion of the first hydraulic motor and to enable fluid to flow to the second hydraulic motor to effect contraction of the second hydraulic motor, said first and second hydraulic motors having axes which intersect at the central portion of the vehicle.

11. An apparatus for use in turning first and second steerable vehicle wheels of a vehicle in response to manual rotation of a steering wheel, said apparatus comprising:

a first cylinder type hydraulic motor connected with the first steerable vehicle wheel and with a central portion of the vehicle, a second cylinder type hydraulic motor connected with the second steerable vehicle wheel and with the central portion of the vehicle, a steering control valve which is connected in fluid communication with said first and second hydraulic motors, said steering control valve being operable in response to manual rotation of the steering wheel in one direction to enable fluid to flow to the first hydraulic motor to effect contraction of the first hydraulic motor and to enable fluid to flow from the second hydraulic motor to effect expansion of the second hydraulic motor, said steering control valve being operable in response to manual rotation of the steering wheel in a direction opposite to the one direction to enable fluid to flow from the first hydraulic motor to effect expansion of the first hydraulic motor and to enable fluid to flow to the second hydraulic motor to effect contraction of the second hydraulic motor, said first and second hydraulic motors having axes which intersect at the central portion of the vehicle, and a secondary control valve which is connected in fluid communication with said first and second hydraulic motors.

12. The apparatus as set forth in claim 11 wherein said secondary control valve is operable in response to rotation of the steering wheel in a first direction to effect operation of said first hydraulic motor to a greater extent than said second hydraulic motor during rotation of the steering wheel in the first direction, said secondary control valve being operable in response to rotation of the steering wheel in a second direction to effect operation of said second hydraulic motor to a greater extent than said first hydraulic motor during rotation of the steering wheel in the second direction.

13. An apparatus for use in turning first and second steerable vehicle wheels of a vehicle in response to manual rotation of a steering wheel, said apparatus comprising:

a first cylinder type hydraulic motor connected with the first steerable vehicle wheel and with a central portion of the vehicle, a second cylinder type hydraulic motor connected with the second steerable vehicle wheel and with the central portion of the vehicle, a steering control valve which is connected in fluid communication with said first and second hydraulic motors, said steering control valve being operable in response to manual rotation of the steering wheel in one direction to enable fluid to flow to the first hydraulic motor to effect contraction of the first hydraulic motor and to enable fluid to flow from the second hydraulic motor to effect expansion of the second hydraulic motor, said steering control valve being operable in response to manual rotation of the steering wheel in a direction opposite to the one direction to enable fluid to flow from the first hydraulic motor to effect expansion of the first hydraulic motor and to enable fluid to flow to the second hydraulic motor to effect contraction of the second hydraulic motor, and a second control valve which is connected in fluid communication with said first and second hydraulic motors and is operable to effect operation of one of said first and second hydraulic motors to a greater extent than the other of said first and second hydraulic motors during turning of the steerable vehicle wheels.

14. The apparatus as set forth in claim 13 further including a pinion in meshing engagement with a part of said first hydraulic motor.

15. The apparatus as set forth in claim 14 wherein said part of said first hydraulic motor is an array of rack gear teeth being disposed on a piston rod of said first hydraulic motor.

16. The apparatus as set forth in claim 13 wherein said first hydraulic motor and said second hydraulic motor are both connected to the central portion at a single pivot connection.

* * * * *